United States Patent
Acker et al.

(10) Patent No.: US 6,199,200 B1
(45) Date of Patent: *Mar. 6, 2001

(54) METHOD AND SYSTEM FOR SUPPORTING DUAL CONVENTIONS FOR METHODS THAT RETURN STRUCTURES

(75) Inventors: Liane Elizabeth Haynes Acker, Round Rock; Larry Keith Raper, Austin, both of TX (US)

(73) Assignee: International Business Machines Corporation, Armonk, NY (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/228,329
(22) Filed: Apr. 15, 1994
(51) Int. Cl.[7] .................................................. G06F 9/00
(52) U.S. Cl. .................................. 717/5; 717/9; 717/8
(58) Field of Search .................................. 395/684, 705, 395/702, 708, 680; 717/5, 8, 9; 709/100, 102, 103, 105

(56) References Cited

U.S. PATENT DOCUMENTS

| | | | |
|---|---|---|---|
| 4,916,610 | * 4/1990 | Bapat | 364/300 |
| 5,146,593 | * 9/1992 | Brandle et al. | 395/700 |
| 5,293,630 | * 3/1994 | Tatge et al. | 395/700 |
| 5,452,456 | * 9/1995 | Mourey et al. | 395/700 |
| 5,455,949 | * 10/1995 | Conder et al. | 395/700 |
| 5,469,574 | * 11/1995 | Chang et al. | 395/700 |
| 5,583,988 | * 12/1996 | Crank et al. | 395/185.01 |
| 5,774,729 | * 6/1998 | Carney et al. | 395/707 |

OTHER PUBLICATIONS

Hayes et al, Facilitating Mixed Language Programming in Distributed Systems, IEEE Trans on Soft Engr. vol. SE–13, No. 12 Dec. 1987.*

* cited by examiner

Primary Examiner—Majid Banankhah
(74) Attorney, Agent, or Firm—Jeffrey S. LaBaw; Felsman, Bradley, Vaden, Gunter & Dillon, LLP (57) ABSTRACT

A technique for providing support for multiple calling conventions for methods and procedures that return structures is provided. A source code of a client program may be compiled by either of two compilers, wherein one compiler employs a calling convention that is different from the first one. A binary library containing a procedure and a converter for each procedure returning a structure to a client program, is provided to support two calling conventions. If the client program is compiled by a compiler using a first calling convention, the program is compiled such that it calls the procedure directly and receives a result, a structure, via the first calling convention. Compiling the client program with a compiler using the second conventions results in calls to the procedure being routed to the converter, which calls the associated procedure, using the first calling convention. The converter receives the result from the procedure and returns the result to the client program using the second calling convention. A special modification to the signature of the procedure as it appears in the library source code, combined with the use of macros to generate a companion converter, permit a binary library to be built by a single compiler, such that the library supports the calling conventions for returning structures appropriate to two different compilers.

13 Claims, 8 Drawing Sheets

```
/*
 * "CreateRectangle"
 * The definition of the rectangle structure is given by the following C or C++ typedef:
 *
 *      typedef {
 *          int origin_x;
 *          int origin_y;
 *          int length;
 *          int height;
 *      } rectangle;
 *
 * This is how the procedure would ideally appear without any
 * consideration for Microsoft/Borland transparency.
 */ extern rectangle CreateRectangle (int x1, int y1, int x2, int y2)
{
    rectangle result;

result.origin_x = x1;
    result.origin_y = y1;
    result.length   = x2 - x1;
    result.height   = y2 - y1;

return result;
}
```

Fig. 5

```
/*
 * CreateRectangle
 */
[extern long] CreateRectangle (int x1, int y1, int x2, int y2)
       └─130
{ [static] rectangle result;
132 result.origin_x = x1;
   result.origin_y = y1;
   result.length   = x2 - x1;
   result.height   = y2 - y1;

return [(long) (void *)] &result;
              134
}
```

Fig. 6

```
/*
 * CreateRectangle Companion Converter Procedure.
 */
CONVERTER (CreateRectangle, rectangle) int x1, int y1, int x2, int y2)
CONVERTER_BODY (CreateRectangle, rectangle, (x1, y1, x2, y2))
```

Fig. 7

CONVERTER_NAME (<procName>)

CONVERTER_PROTO (<procName>, <structureTypeName>, <protoArgs>)

CONVERTER (<procName, <structureTypeName>) <argList-specifier>

CONVERTER_BODY (<procName>, <structTypeName>, <actualArguments>)

*Fig. 8*

```
#if defined (__BORLANDC__)
#define CreateRectangle CONVERTER_NAME(CreateRectangle)
#endif
```

*Fig. 9*

```
define CONVERTER_NAME(procName)  bcc_ ## procName if defined(__BORLANDC__) /* This section supports the Borland compiler */ define CONVERTER_PROTO(procName,strucType,argList)\
    extern strucType CONVERTER_NAME(procName) argList;

#define CONVERTER(procName,strucType)\
    extern strucType CONVERTER_NAME(procName) ( define CONVERTER_BODY(procName,strucType,args)\          */\
    {\                                                    */\
    long L;            /* Holds the result from the actual procedure.  */\
    strucType *S;      /* Holds the coerced form of L above.           */\
    L = procName args; /* For a method, replace with the appropriate   */\
                       /* form of method resolution expression.        */\
    S = (strucType *) (void *) L ; /* Coerce L to be a struct pointer. */\
    return *S ;        /* Return struct using Borland convention.      */\
    } else              /* This section supports the Microsoft compiler   */ define CONVERTER_PROTO(procName,strucType,argList)

define CONVERTER(procName,strucType)\
    extern long CONVERTER_NAME(procName) (strucType *result, define CONVERTER_BODY(procName,strucType,args)\
    {\
    long *L;           /* Holds the coerced result of the actual proc. */\
    *result = *((strucType *) (void *) (procName args));\
                       /* For a method, replace prior line with the    */\
                       /* appropriate form of method resolution expr.  */\
    L = (long *) &result; /* Coerce the addr of the struct to be a long */\
    return *L;         /* Return struct using Borland convention.      */\
    }
#endif /* defined(__BORLANDC__) */
```

METHOD AND SYSTEM FOR SUPPORTING DUAL CONVENTIONS FOR METHODS THAT RETURN STRUCTURES

BACKGROUND OF THE INVENTION

1. Technical Field

The present invention relates in general to an improved data processing system and in particular to a method and system for supporting dual calling conventions between different compilers. Still more particularly, the present invention relates to a method and system for supporting dual calling conventions between different compilers for methods that return structures.

2. Description of the Related Art

A "compiler" is a program that translates programs written in a high-level programming language into the native machine language of a data processing system. The input into a compiler is the "source program" or "source code" and the output is called the "object program" or "target code". Presently, in the DOS/Windows environment, no universally agreed upon calling convention exists for procedures returning structures when source code is compiled into object code. For example, most C or C++ compilers implement one of two systems for returning structures. One involves defining attributes that return pointers to structures and another entails employing a method where the caller provides a hidden argument for passing a structure back to the caller. The first is employed by Microsoft's C and C++ compiler while the second method of returning structures is employed by Borland's compiler for C and C++. Borland C and Borland C++ are available from Borland International, Inc., located in Scotts Valley, Calif. C and C++ compilers are available from Microsoft Corporation located in Redmond, Wash. As a result, between the Borland and Microsoft compilers, no binary standard exists for procedures returning structures.

For products featuring binary class libraries or binary procedure libraries, this lack of standardization can become a severe problem. Some software vendors avoid this problem by excluding methods or procedures returning structures. However, in order to facilitate the construction and distribution of language-independent class libraries that can be distributed in binary form, it is sometimes necessary to provide procedures which return structures.

Therefore, it would be advantageous to have a method and system for providing compatibility between different calling conventions found in different compilers for procedures returning structures.

SUMMARY OF THE INVENTION

It is therefore one object of the present invention to provide an improved data processing system.

It is another object of the present invention to provide a method and system for supporting dual calling conventions between different compilers.

It is yet another object of the present invention to provide a method and system for supporting dual calling conventions between different compilers for methods that return structures.

The foregoing objects are achieved as is now described. According to the present invention, a technique is provided for supporting multiple calling conventions for methods and procedures that return structures. A source code of a client program may be compiled by either of two compiler types, wherein one compiler type employs a calling convention that is different from the other. A binary library containing procedures, and a converter procedure for each procedure returning a structure to a client program, is provided to support two calling conventions. If the client program is compiled by a compiler using a first calling convention, the program is compiled such that it calls the procedure directly and receives a result, a structure, via the first calling convention. Compiling the client program with a compiler using the second convention results in calls to the procedure being routed to the converter, which calls the associated procedure, using the first calling convention. The converter receives the result from the procedure and returns the result to the client program using the second calling convention. A special modification to the signature of the procedure as it appears in the library source code, combined with the use of macros to generate a companion converter, permit a binary library to be built by a single compiler, such that the library supports the calling conventions for returning structures appropriate to two different compilers.

The binary library may be created by inserting one or more macros into the binary library, modifying the signature for the result, and using a compiler following either calling procedure. Compiling the binary library with the macros results in the expansion of the code appropriate for the calling convention employed by the compiler.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
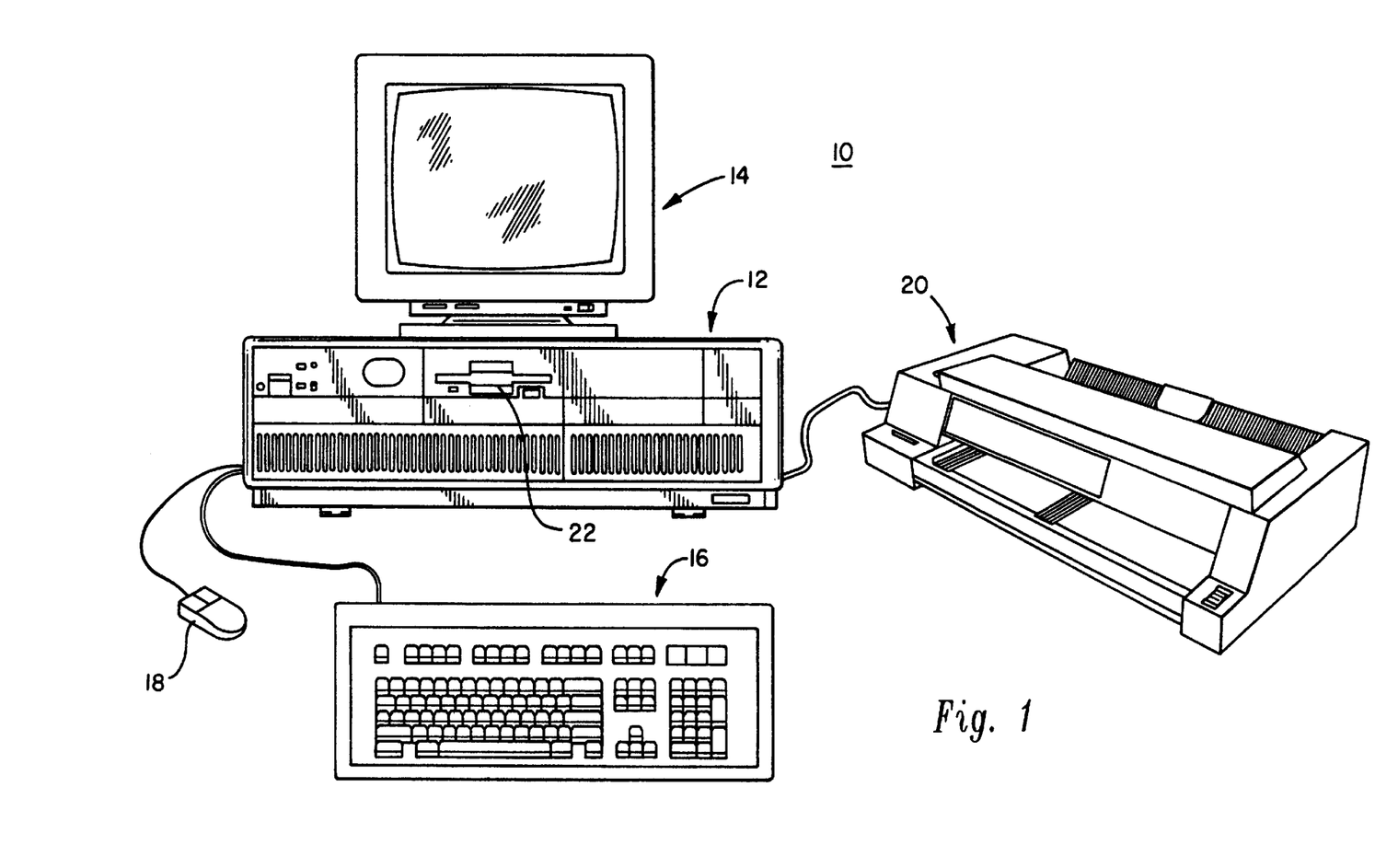
FIG. 1 depicts a data processing system in which the present invention can be employed.

Referring now to the figures, and in particular to FIG. 1, there is shown a data processing system, personal computer system 10, in which the present invention can be employed is depicted. As shown, personal computer system 10 comprises a number of components, which are interconnected together. More particularly, a system unit 12 is coupled to and can drive an optional monitor 14 (such as a conventional video display). A system unit 12 also can be optionally coupled to input devices such as a PC keyboard 16 or a mouse 18. Mouse 18 includes right and left buttons (not shown). The left button is generally employed as the main selector button and alternatively is referred to as the first mouse button or mouse button 1. The right button is typically employed to select auxiliary functions as explained later. The right mouse button is alternatively referred to as the second mouse button or mouse button 2. An optional output device, such as a printer 20, also can be connected to the system unit 12. Finally, system unit 12 may include one or more mass storage devices such as the diskette drive 22.

As will be described below, the system unit 12 responds to input devices, such as PC keyboard 16, the mouse 18, or local area networking interfaces. Additionally, input/output (I/O) devices, such as diskette drive 22, display 14, printer 20, and local area network communication system are connected to system unit 12 in a manner well known. Of course, those skilled in the art are aware that other conventional components also can be connected to the system unit 12 for interaction therewith. In accordance with the present invention, personal computer system 10 includes a system processor that is interconnected to a random access memory (RAM), a read only memory (ROM), and a plurality of I/O devices.

In normal use, personal computer system 10 can be designed to give independent computing power to a small group of users as a server or a single user and is inexpensively priced for purchase by individuals or small businesses. In operation, the system processor functions under an operating system, such as IBM's OS/2 operating system or DOS. OS/2 is a registered trademark of International Business Machines Corporation. This type of operating system includes a Basic Input/Output System (BIOS) interface between the I/O devices and the operating system. BIOS, which can be stored in a ROM on a motherboard or planar, includes diagnostic routines which are contained in a power on self test section referred to as POST.

Figure 2:
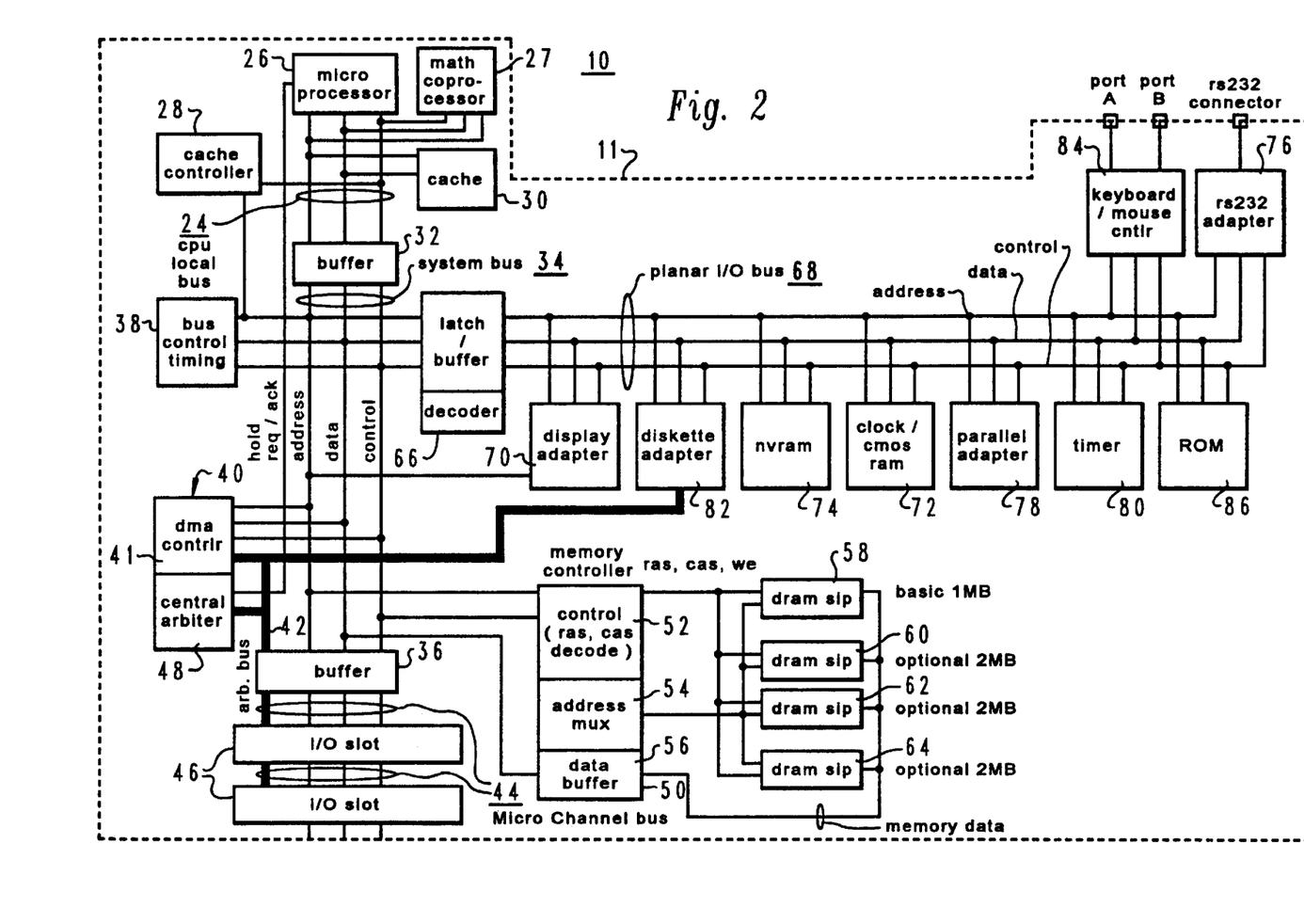
FIG. 2 is a block diagram of the data processing system depicted in FIG. 1.

Prior to relating the above structure to the present invention, a summary of the operation in general of personal computer system 10 may merit review. Referring to FIG. 2, there is shown a block diagram of personal computer system 10 illustrating the various components of personal computer system 10 in accordance with the present invention. FIG. 2 further illustrates components of planar 11 and the connection of planar 11 to the I/O slots 46 and other hardware of personal computer system 10. Connected to planar 11 is the system central processing unit (CPU) 26 comprised of a microprocessor which is connected by a high speed CPU local bus 24 through a bus controlled timing unit 38 to a memory control unit 50 which is further connected to a volatile random access memory (RAM) 58. While any appropriate microprocessor can be used for CPU 26, one suitable microprocessor is the 80386 which is sold by Intel.

While the present invention is described hereinafter with particular reference to the system block diagram of FIG. 2, it is to be understood at the outset of the description which follows, it is contemplated that the apparatus and methods in accordance with the present invention may be used with other hardware configurations of the planar board. For example, the system processor could be an Intel 80286, 80486, or Pentium microprocessor. "Pentium" is a trademark of Intel Corporation. These particular microprocessors can operate in a real addressing mode or a protected addressing mode. Each mode provides an addressing scheme for accessing different areas of the microprocessor's memory.

Returning now to FIG. 2, CPU local bus 24 (comprising data, address and control components) provides for the connection of CPU 26, an optional math coprocessor 27, a cache controller 28, and a cache memory 30. Also coupled on CPU local bus 24 is a buffer 32. Buffer 32 is itself connected to a slower speed (compared to the CPU local bus) system bus 34, also comprising address, data and control components. System bus 34 extends between buffer 32 and a further buffer 36. System bus 34 is further connected to a bus control and timing unit 38 and a Direct Memory Access (DMA) unit 40. DMA unit 40 is comprised of a central arbitration unit 48 and a DMA controller 41. Buffer 36 provides an interface between the system bus 34 and an optional feature bus such as the Micro Channel bus 44. "Micro Channel" is a registered trademark of International Business Machines Corporation. Connected to bus 44 are a plurality of I/O slots 46 for receiving Micro Channel adapter cards which may be further connected to an I/O device or memory. An arbitration control bus 42 couples the DMA controller 41 and central arbitration unit 48 to I/O slots 46 and diskette adapter 82. Also connected to system bus 34 is a memory control unit 50 which is comprised of a memory controller 52, an address multiplexer 54, and a data buffer 56. Memory control unit 50 is further connected to a random access memory as represented by RAM module 58. Memory controller 52 includes the logic for mapping addresses to and from CPU 26 to particular areas of RAM 58. While the microcomputer system 10 is shown with a basic 1 megabyte RAM module, it is understood that additional memory can be interconnected as represented in FIG. 2 by the optional memory modules 60 through 64.

A further buffer 66 is coupled between system bus 34 and a planar I/O bus 68. Planar I/O bus 68 includes address, data, and control components respectively. Coupled along planar bus 68 are a variety of I/O adapters and other peripheral components such as display adapter 70 (which is used to drive an optional display 14), a clock 72, nonvolatile RAM 74 (hereinafter referred to as "NVRAM"), a RS232 adapter 76, a parallel adapter 78, a plurality of timers 80, a diskette adapter 82, a PC keyboard/mouse controller 84, and a read only memory (ROM) 86. The ROM 86 includes BIOS which provides the user transparent communications between many I/O devices.

Clock 72 is used for time of day calculations. NVRAM 74 is used to store system configuration data. That is, the NVRAM will contain values which describe the present configuration of the system. For example, NVRAM 74 contains information which describe the capacity of a fixed disk or diskette, the type of display, the amount of memory, etc. Of particular importance, NVRAM 74 will contain data which is used to describe the system console configuration; i.e., whether a PC keyboard is connected to the keyboard/mouse controller 84, a display controller is available or the ASCII terminal is connected to RS232 adapter 76. Furthermore, these data are stored in NVRAM 74 whenever a special configuration program is executed. The purpose of the configuration program is to store values characterizing the configuration of this system to NVRAM 76 which are saved when power is removed from the system.

Connected to keyboard/mouse controller 84 are ports A and B. These ports are used to connect a PC keyboard (as opposed to an ASCII terminal) and mouse to the PC system. Coupled to RS232 adapter unit 76 is an RS232 connector.

An optional ASCII terminal can be coupled to the system through this connector.

Specifically, personal computer system 10 may be implemented utilizing any suitable computer such as the IBM PS/2 computer or an IBM RISC SYSTEM/6000 computer, both products of International Business Machines Corporation, located in Armonk, N.Y. "RISC SYSTEM/6000" is a trademark of International Business Machines Corporation and "PS/2" is a registered trademark of International Business Machines Corporation. A preferred embodiment of the present invention may be implemented in the data processing system depicted in FIGS. 1 and 2.

The present invention described herein may be applied equally well to both methods and procedures. A "method" is a term used in object-oriented programming to describe procedures that are invoked indirectly using a run-time resolution mechanism that typically should be as short and fast as possible. All of the same calling conventions used by procedures are also used for methods because each method indication ultimately resolves to some particular procedure. The preferred embodiment of the present invention is directed to the calling conventions employed in Microsoft's C and C++ compilers and Borland's C and C++ compilers. Those of ordinary skill in the art will realize that the present invention maybe applied to compilers other than those from Microsoft and Borland.

Figure 3:
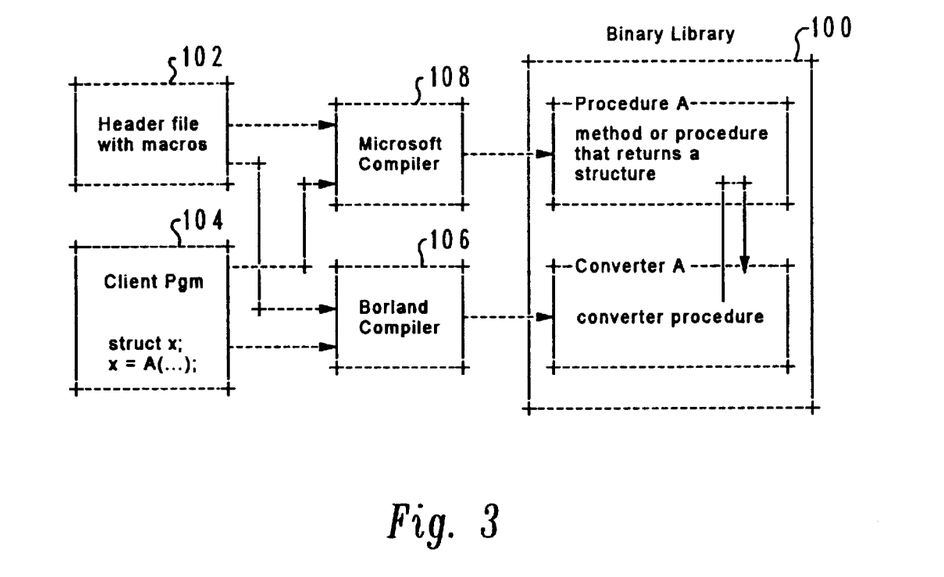
FIG. 3 depicts a block diagram illustrating compilation of a client program.

Referring now to FIG. 3, a block diagram depicting compilation of a client program is illustrated. In accordance with the preferred embodiment of the present invention, the calling convention employed by Microsoft's C++ compiler (hereinafter referred to as the "primary convention") is relied upon for returning structures. Selecting only a single convention for the method resolution mechanism allows this mechanism to remain as short and as fast as possible. Such a selection requires users having a Borland C++ compiler following the "secondary convention" to include a process for producing a set of procedures in binary form that will return structures adhering to the primary convention. This process is described in more detail below.

Binary library 100 includes a converter procedure, such as Converter A, for every method or procedure that returns a structure, such as procedure A. Converter A is a companion procedure to Procedure A. Converter A supports the secondary convention (i.e., the convention followed by the Borland compiler for returning structures) and can be called by programs whose compiler employs the secondary convention. The invocation of the converter procedure invokes the actual method or procedure, i.e., Procedure A, that understands only the primary convention. This mechanism requires those who write libraries using a Microsoft compiler to have some means of producing the binary form of a converter procedure that returns structures that adhere to the secondary convention. This is described in more detail below.

A header file 102 with macros for users of binary library 100 is included with client program 104 according to the present invention. Compiling client program 104 with header file 102 in a Borland compiler 106 results in initiation of Converter A in binary library 100. Converter A makes the appropriate calls to Procedure A, which only understands the primary convention. Compiling client program 104 with header file 102 by a Microsoft compiler 108 bypasses Converter A with Procedure A being the only process invoked within binary library 100 during compilation of the program.

Converter functions are only employed when methods or procedures returning structures are present. All other methods or procedures already employ a calling convention that is common to both Microsoft and Borland compilers.

Figure 4:
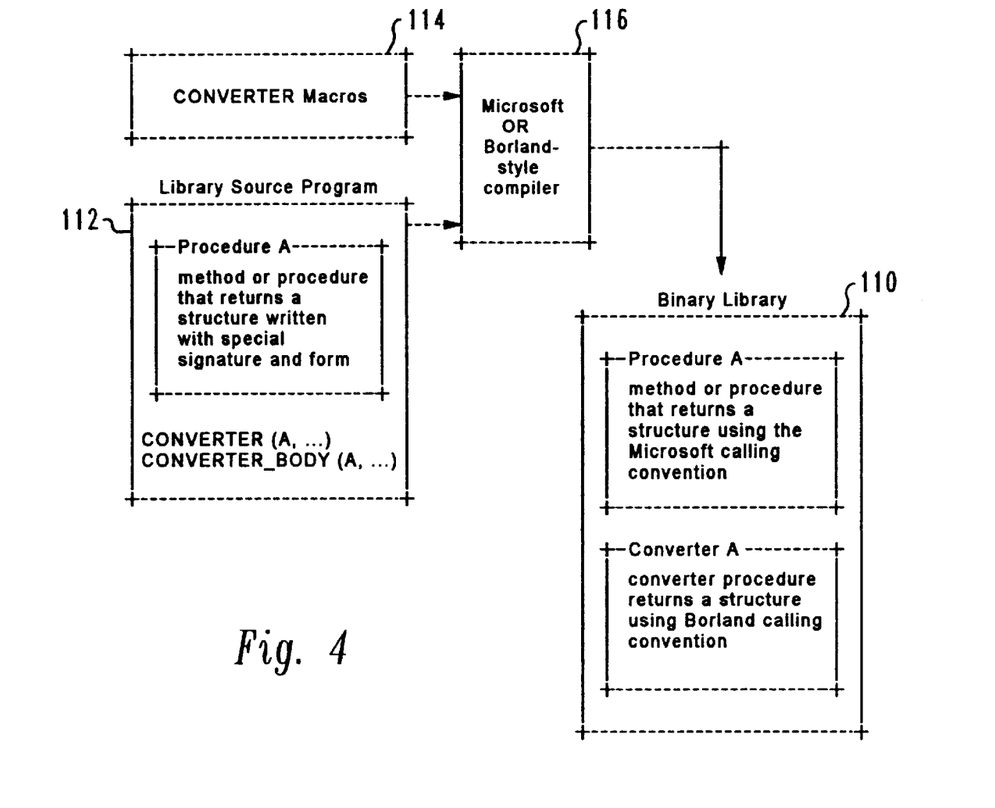
FIG. 4 is a block diagram of a process for creating a binary library.

Referring now to FIG. 4, a block diagram of a process for creating a binary library is illustrated according to the present invention. Binary library 110 includes Procedure A, a method or procedure that returns a structure using the primary convention. In addition, binary library 110 includes Converter A, which is a converter procedure that returns a structure using the secondary calling convention. Binary library 110 is created by compiling a library source program 112 and converter macros 114 in a compiler 116. Compiler 116 may be either a Microsoft or Borland compiler. In creating binary library 110, the method or procedure should adhere to the primary calling convention and a converter procedure should implement the secondary convention regardless of the compiler employed to create the library.

In accordance with the preferred embodiment of the present invention, standard ANSI C or C++ source code is used to permit class library developers to write a method or procedure that always produces a binary form following the primary convention when compiled by either a Microsoft or Borland compiler. In addition, converter macros 114 automatically generate the necessary C or C++ source code written in ANSI C or C++ for a converter procedure following the Borland calling convention when compiled by either a Microsoft or Borland compiler.

The method and system of the present invention is directed towards client programs that are compiled separately from the binary library itself. In this situation, the methods and procedures in the library may be compiled with signatures that do not necessarily agree with the signatures employed in the client program compilations, provided that the differences in the expression of the signature in the separate compilations do not produce differences in the resulting binary code. The term "signature" is used to designate all of the details associated with the interface to a procedure, including its name, its return type, and the number and types of all of its parameters.

Figure 5:
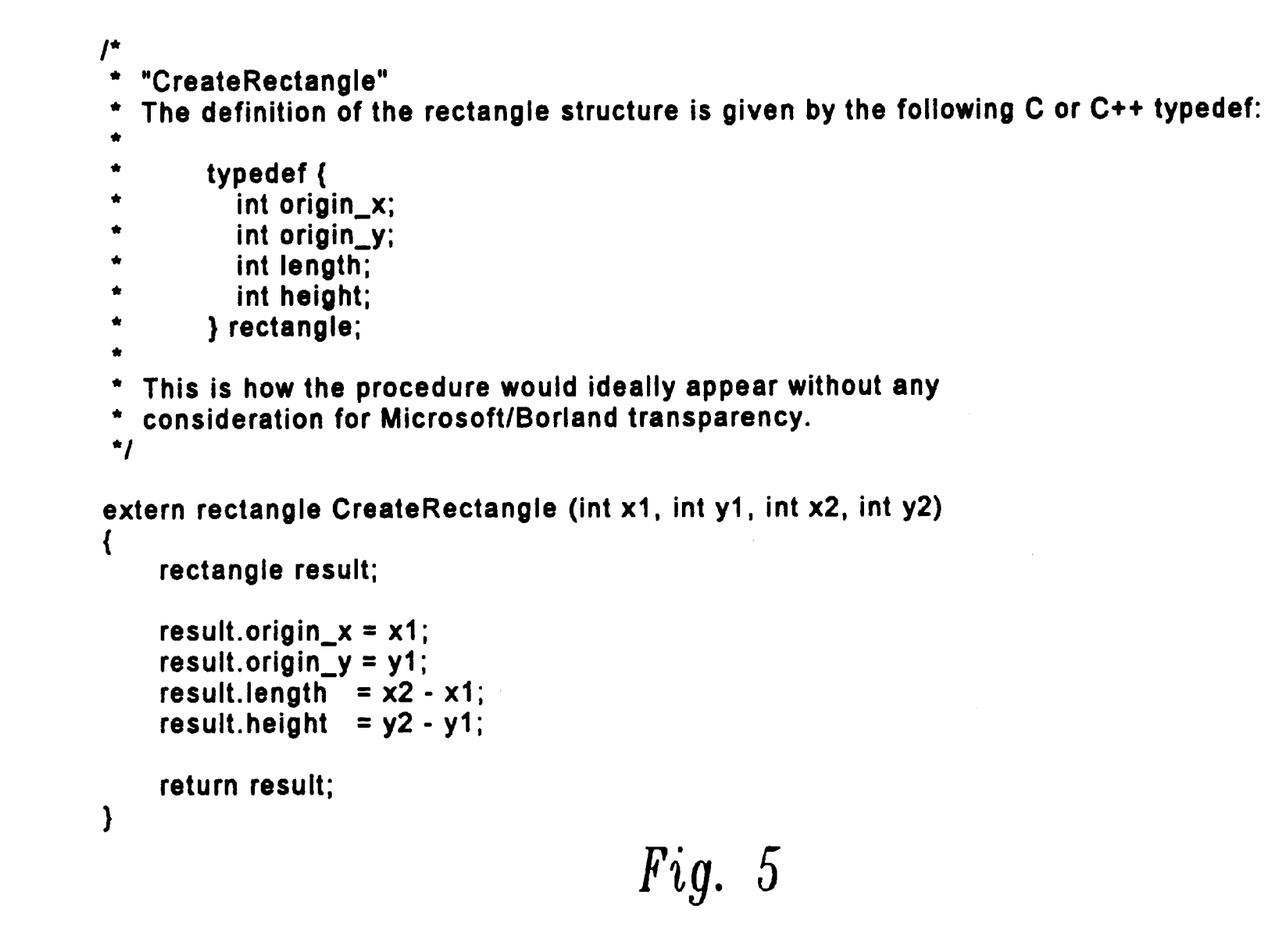
FIG. 5 depicts code for a procedure that returns a structure in an ideal format.

Referring now to FIG. 5, an example is provided of a procedure named "CreateRectangle" that returns a structure of the type "rectangle".

This procedure appears in an ideal format. The CreateRectangle procedure is a procedure that may be placed in a library by a software developer. Modifications, however, are required to implement the preferred embodiment of the present invention as shown hereafter.

Figure 6:
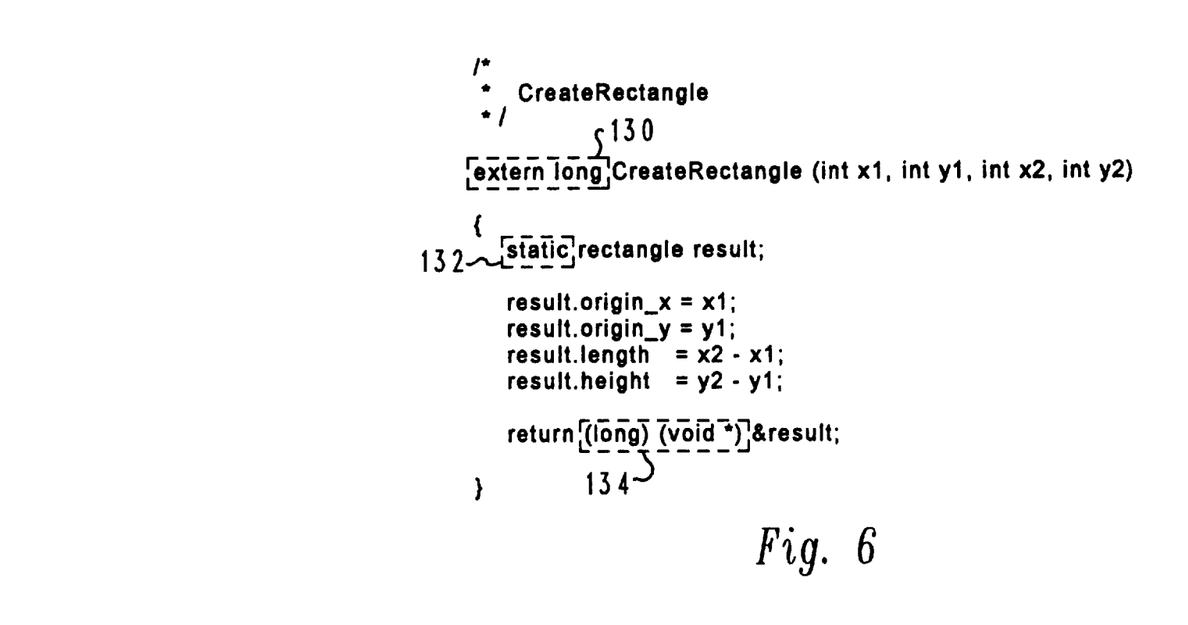
FIG. 6 is an illustration of a procedure that returns a structure having a modified signature.

Next, a block of code for a procedure employing the present invention is illustrated in FIG. 6. The code for the CreateRectangle procedure has modified the signature so that it no longer indicates that a structure is being returned in accordance with a preferred embodiment of the present invention. Compilation by either a Microsoft or Borland compiler results in a binary procedure returning a structure using the primary calling convention. In addition, a "static" attribute is used when declaring result and the return statement as shown in sections 130, 132, and 134 in FIG. 6. For any other procedures the four lines of code in the middle are replaced by the desired code to implement the procedure.

Figure 7:
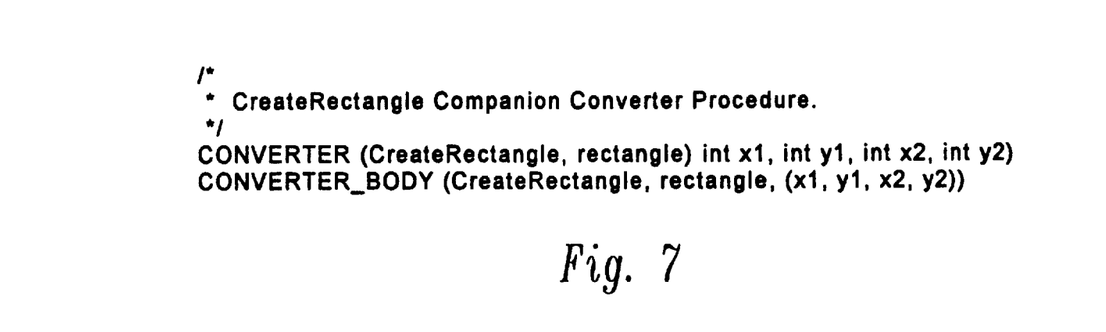
FIG. 7 depicts a converter procedure that is a companion to the procedure depicted in FIG. 6.

Referring now to FIG. 7, a converter procedure is shown which is a companion to the CreateRectangle procedure in FIG. 6. The converter procedure is generated using the code in FIG. 7, which calls two macros. When these macros are compiled with either a Microsoft or Borland compiler, a converter procedure supporting the Borland calling conventions results for procedures that return structures.

Figure 8:
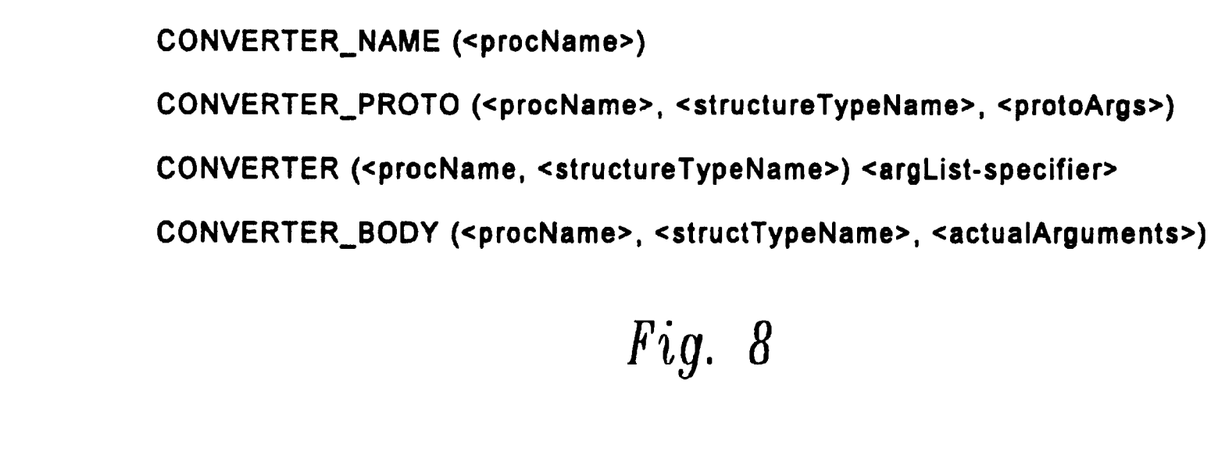
FIG. 8 is an illustration of syntax for four converter macros.

Referring now to FIG. 8, syntax for the four converter macros is depicted. The CONVERTER_NAME macro and the CONVERTER_PROTO macro are used with the client program (shown as 102 in FIG. 3) while the CONVERTER macro and the CONVERTER_BODY macro are used when developing a binary library (shown as 114 in FIG. 4). The items enclosed in angle brackets ("<" and ">") are employed to indicate that the user must supply an appropriate parameter for these items. The <protoArgs> item refers to a parenthesized list of the procedure's argument types as would be appropriate for any procedure prototype. In the example for CreateRectangle, the arguments are: (int X1, int Y1, int X2, int Y2). <argList-specifier> refers to an argument list that appears in the declaration of the procedure, including the closing right parenthesis, but omitting the opening left parenthesis. In the example above, the value is: int X1, int Y1, int X2, int Y2). The <actualArguments> refers to a parenthesized list of the names of the arguments separated with commas as necessary. Once again in the CreateRectangle example this appears as:(X1, Y1, X2, Y2).

Next, the CONVERTER_NAME macro is used to ensure that the name of the converter procedure is derived from the actual subject procedure in a consistent manner.

Figure 9:
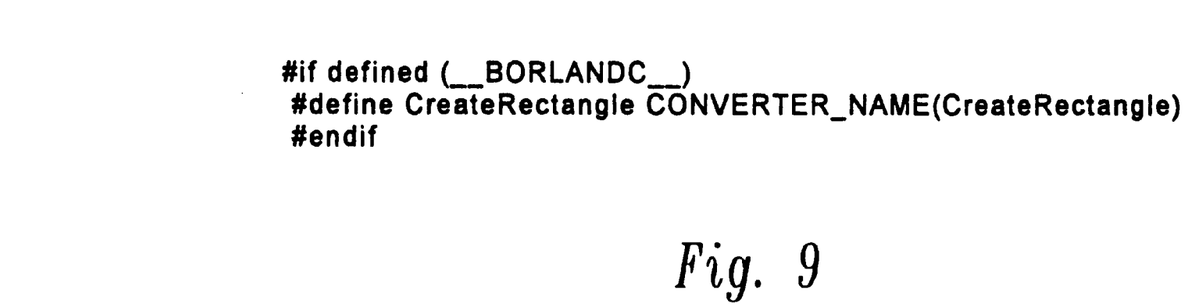
FIG. 9 illustrates an example of the use of a macro to substitute the use of a converter procedure in place of the procedure.

The present invention provides a CONVERTER_PROTO macro that is used (shown as 102 in FIG. 3) when compiling a client program to provide a prototype with the correct client signature for the converter procedure. For a Microsoft client program, the expansion of this macro does not occur because the converter procedure is not employed by a Microsoft client program. An example of the use of a CONVERTER_NAME macro to redefine the invocation of a procedure that returns a structure to substitute the use of the converter procedure in its place is illustrated in FIG. 9. The macro is shown for use with the CreateRectangle procedure. The CONVERTER_PROTO macro is implemented in a similar fashion.

Figure 10:
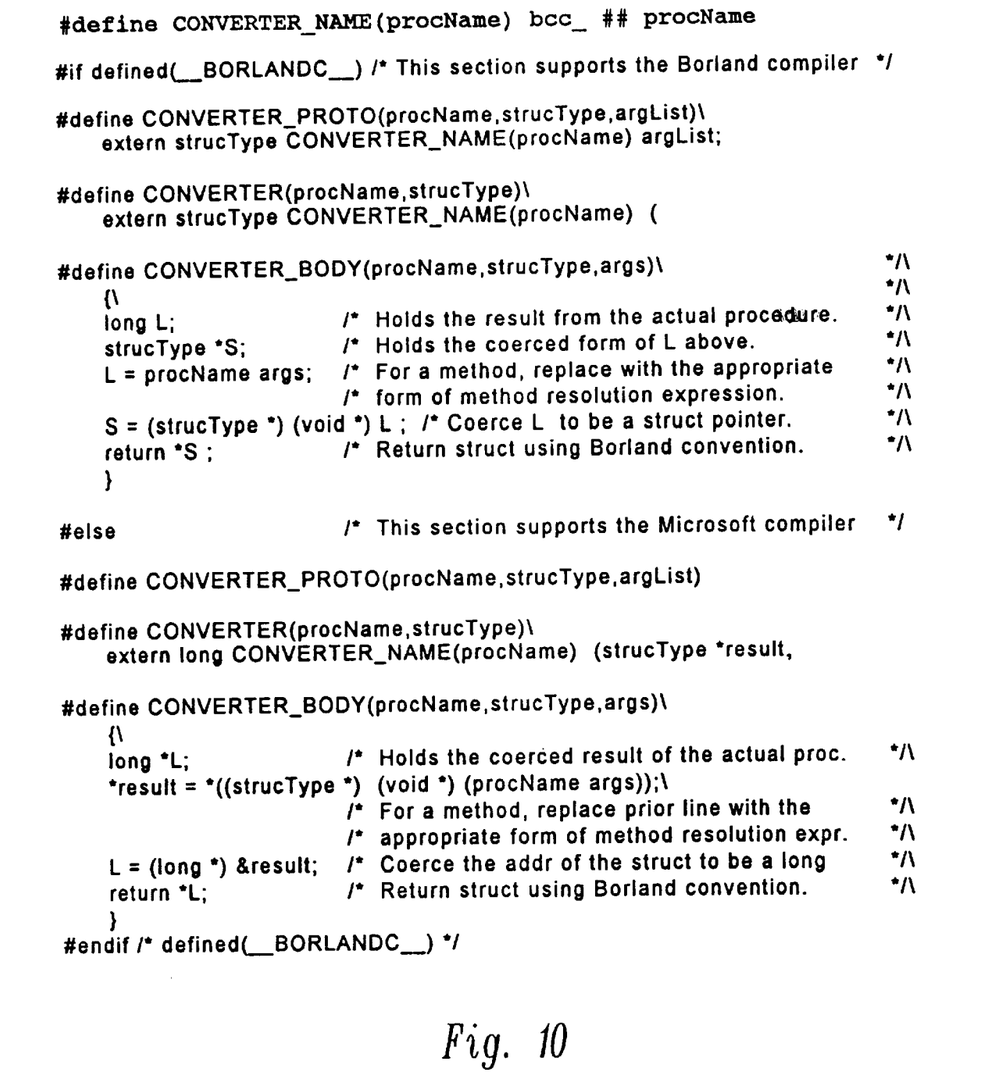
FIG. 10 is an illustration of the converter and converter body macros.

The CONVERTER macro and the CONVERTER_BODY macro, illustrated in FIG. 10, are used to generate the actual converter procedure itself in a form appropriate for the compiler that will expand it. When a Microsoft compiler is used to compile these macros, a converter function results that simulates the Borland calling convention using a signature appropriate for a Microsoft compiler. Similarly, the use of a Borland compiler to compile these macros results in a converter function that returns a structure using the Borland calling convention with a signature appropriate for a Borland compiler.

Figure 11:
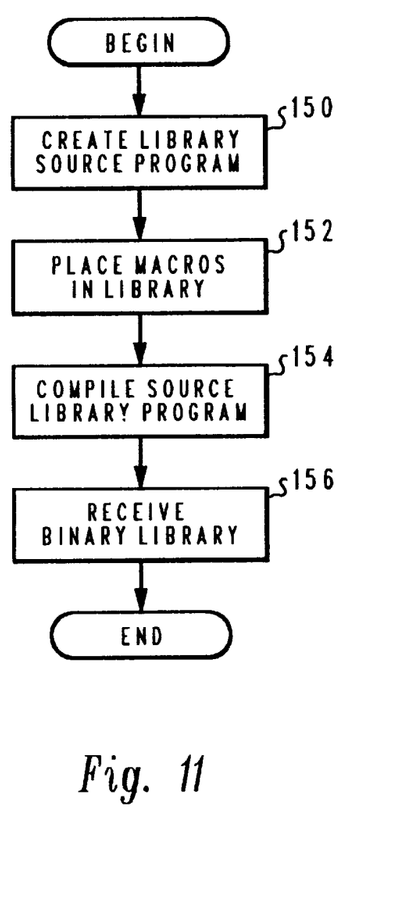
FIG. 11 depicts a process for creating a binary library including both the procedure and a converter.

With reference next to FIG. 11, a process for creating a binary library including both a procedure and a converter is illustrated according to the present invention. A library source program is created, as illustrated in block 150. CONVERTER and CONVERTER_BODY macros are included in the library as illustrated in block 152. The library is compiled by a compiler, as depicted in block 154. Thereafter, a procedure and a converter are included in a compiled binary library, as illustrated in block 156.

Figure 12:
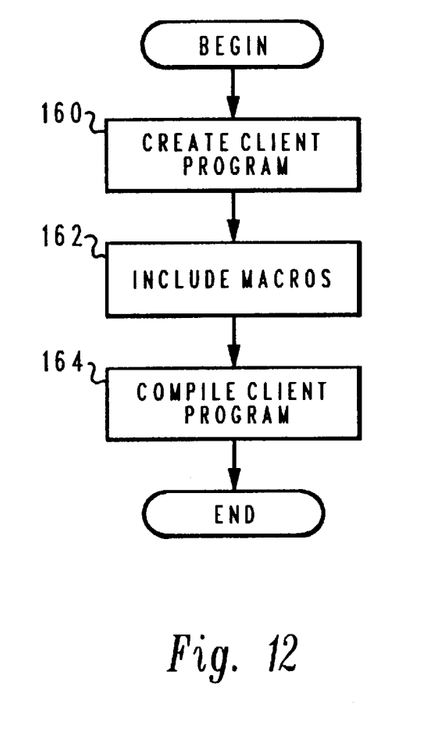
FIG. 12 is a procedure for compiling client programs using either a Microsoft compiler or a Borland compiler.

Referring now to FIG. 12, a procedure for compiling client programs using either a Microsoft compiler or a Borland compiler is depicted. The client program is created, as illustrated in block 162. Thereafter, converter macros are included in the client program, typically as on included header file as depicted in block 164. Specifically, the CONVERTER_PROTO and CONVERTER_NAME macros are used when compiling client programs to provide a prototype with the correct client signature for the converter procedure. As mentioned before, a Microsoft client program does not result in any expansion of this macro because the converter procedure is not employed by a Microsoft client program. After the macros are included, the client program is compiled with either a Microsoft compiler or a Borland compiler, as illustrated in block 166.

According to the preferred embodiment of the present invention, client programs may be compiled by either a Microsoft or Borland compiler using the present invention. Another feature provided by the present invention is that libraries may be created that will support both the primary and secondary conventions. As a result, the present invention offers a technique for creating methods and procedures that return structures independent of the calling conventions built into a user's compiler.

While the invention has been particularly shown and described with reference to a preferred embodiment, it will be understood by those skilled in the art that various changes in form and detail may be made therein without departing from the spirit and scope of the invention.

What is claimed is:

1. A data processing system for providing support for dual calling conventions comprising:
   a library including:
      first source code implementing a procedure conforming to a first convention, wherein the procedure includes:
         a first calling means for receiving calls for the procedure conforming to the first convention; and
         a first return means for returning a result using the first convention;
      second source code implementing a converter for the procedure conforming to a second convention, wherein said converter includes:
         means, responsive to a call using the second convention, for calling the procedure using the first convention;
         means for receiving a result from the procedure using the first convention; and
         a second return means for returning the result using the second convention; and
   a signature associated with the first and second source code permitting compilation by one of at least two compilers employing different conventions,
   wherein a first compiler employing the first convention compiles the first source code and a second compiler employing the second convention compiles the first and second source code.

2. The data processing system of claim 1, wherein the result returned is a structure.

3. The data processing system of claim 2, wherein the first return means comprises means for returning an address of the structure.

4. The data processing system of claim 3, wherein the second return means comprises means for returning a pointer to the address of the structure.

5. The data processing system of claim 4, wherein the source code for the converter further comprises a header file.

6. The data processing system of claim 2 further comprising a program, the program having a calling means for calling the procedure and a reception means for receiving the result from the library.

7. The data processing system of claim 6, wherein the program is generated by a program source code, including a library header file, compiled by a compiler, wherein the library header file is a macro call to a macro, the macro including code to direct a call from the program to either the procedure or the converter.

8. A method in a data processing system for providing support for dual calling conventions comprising:

providing a library, the library including source code for a procedure, wherein executable code generated by compiling the source code receives calls conforming to a first convention;

providing a header file including source code for a converter conforming to a second convention, wherein executable code generated by compiling the header file receives calls conforming to the second convention and employs the first convention for calling the procedure;

including within the library a signature permitting the procedure to be compiled by one of at least two compilers employing different conventions;

responsive to compilation by a first compiler employing the first convention, compiling the source code for the procedure, wherein the executable code for the procedure, responsive to a call from a program using the first convention, returns a result to the program using the first convention; and responsive to compilation by a second compiler employing the second convention:
  compiling the source code for the header file, wherein the executable code for the converter generated by compiling the header file, responsive to a call from a program using the second convention, calls the procedure using the first convention, receives a result from the procedure using the first convention, and returns the result to the program using the second convention; and
  compiling the source code for the procedure, wherein executable code for the procedure, responsive to a call from the converter using the first convention, returns the result to the converter using the first convention.

9. The method of claim 8 further comprising:

providing source code for a program;

providing a program macro for generating code to direct calls to the procedure in response to compiling the source code for the program by a compiler using the first convention and code to direct calls to the converter procedure in response to compiling the source code for the program by a compiler using the second convention;

including a macro call to the program macro; and compiling the source code for the program.

10. A method for providing support for dual calling conventions in a data processing system comprising:

providing an application source code referencing a process in a library implemented by procedure source code having an associated header file for a converter; and compiling the application source code, wherein the step of compiling the application source code further comprises:
  in response to the application source code being compiled by a first compiler using a first convention, compiling the procedure source code to generate executable code for the process; and
  in response to the application source code being compiled by a second compiler using a second convention, compiling the procedure source code and the header file to generate executable code for the process and for the converter,
  wherein an executable application generated by the first compiler responds directly to calls using the first convention, and
  wherein an executable application generated by the second compiler passes a call using the second convention to the converter, the converter calls the process using the first convention, the converter receives a result from the process using the first convention, and the converter returns the result to the application using the second convention.

11. The method of claim 10, wherein the result of the compiling step is a process for creating a structure.

12. A computer program product for use with a data processing system for providing support for dual calling conventions, the computer program product comprising:

a computer usable medium;

library source code including procedure source code for a procedure responsive to a first calling convention;

a header file including a converter macro to generate source code for a converter providing support for a second calling convention for calling the procedure;

a signature for the library source code including a macro call to the converter macro to include source code for the converter with the procedure source code during compilation,
  wherein compilation of an application source code referencing the procedure by a first compiler employing the first calling convention generates executable code for the procedure and compilation of the application source code by a second compiler employing the second calling convention generates executable code for the converter and the procedure,
  wherein the executable code for the converter, responsive to a call from a program using the second calling convention, calls the procedure using the first calling convention, receives a result from the procedure using the first calling convention, and returns the result to the program using the second calling convention,
  wherein the library source code, header file, and signature are embodied within the computer usable medium.

13. A computer program product for use with a data processing system for providing support for dual calling conventions for an application source code, the computer program product comprising:

a computer usable medium; and instructions for compiling the application source code, wherein an application generated from compiling the application source code makes a call to a procedure in a library, wherein the application sends the call to the procedure using a first calling convention, the application source code being compiled by a first compiler using the first calling convention; and the application sends the call to a converter in response to the application source code being compiled by a second compiler using a second calling convention, wherein the converter procedure calls the procedure using the first calling convention, receives a result from the procedure using the first calling convention, and returns the result to the application using the second calling convention, wherein the instructions are embodied within the computer usable medium.

* * * * *